US011879969B2

(12) United States Patent
Bageshwar et al.

(10) Patent No.: US 11,879,969 B2
(45) Date of Patent: Jan. 23, 2024

(54) RADAR ALTIMETER INERTIAL VERTICAL LOOP

(71) Applicant: Honeywell International Inc., Charlotte, NC (US)

(72) Inventors: Vibhor L. Bageshwar, Rosemount, MN (US); Zdenek Kana, Dubnany (CZ); Milos Sotak, Košice-Šaca (SK)

(73) Assignee: Honeywell International Inc., Charlotte, NC (US)

( * ) Notice: Subject to any disclaimer, the term of this patent is extended or adjusted under 35 U.S.C. 154(b) by 165 days.

(21) Appl. No.: 17/586,545

(22) Filed: Jan. 27, 2022

(65) Prior Publication Data
US 2023/0236316 A1    Jul. 27, 2023

(51) Int. Cl.
G01S 13/933    (2020.01)
G01S 13/60     (2006.01)
G01S 13/88     (2006.01)

(52) U.S. Cl.
CPC ............ G01S 13/933 (2020.01); G01S 13/60 (2013.01); G01S 13/882 (2013.01)

(58) Field of Classification Search
CPC ....... G01S 13/933; G01S 13/60; G01S 13/882
See application file for complete search history.

(56) References Cited

U.S. PATENT DOCUMENTS

| 4,882,697 | A  | 11/1989 | Ross |
| 4,884,697 | A  | 12/1989 | Takacs et al. |
| 6,492,934 | B1 | 12/2002 | Hwang et al. |
| 7,145,501 | B1 | 12/2006 | Manfred et al. |

(Continued)

FOREIGN PATENT DOCUMENTS

| DE | 102004040249 A1 | 5/2005 |
| EP | 3855117 A1 | 7/2021 |
| WO | WO-2022221916 A1 * | 10/2022 |

OTHER PUBLICATIONS

European Patent Office, "Extended European Search Report", from EP Application No. 23150824.3, from Foreign Counterpart to U.S. Appl. No. 17/586,545, dated Jun. 26, 2023, pp. 1 through 10, Published: EP.

(Continued)

*Primary Examiner* — Bernarr E Gregory
*Assistant Examiner* — Kenneth W Good
(74) *Attorney, Agent, or Firm* — Fogg & Powers LLC (57) ABSTRACT

A system to provide navigation solutions for vehicle landing guidance comprises onboard aiding sensors, an IMU, a radar altimeter, a map database, and a navigation system including a navigation filter that outputs estimated kinematic state statistics for the vehicle. An onboard processor inputs horizontal and vertical position statistics from the navigation filter into the map database, and computes an estimated ground/object height, ground/object velocity, ground/object acceleration, and error statistics thereof, based on terrain and object map data. The processer includes a radar altimeter inertial vertical loop (RIVL) filter that determines relative vertical acceleration based on a difference between vehicle vertical acceleration and ground/object vertical acceleration; determines relative vertical velocity based on a difference between vehicle vertical velocity and ground/object vertical velocity; performs consistency checks on the relative vertical acceleration and relative vertical velocity; and outputs estimated vehicle vertical position and vertical velocity statistics for compensation of the navigation filter outputs.

20 Claims, 8 Drawing Sheets

(56) References Cited

U.S. PATENT DOCUMENTS

| | | | |
|---|---|---|---|
| 8,594,927 | B2 | 11/2013 | Louis et al. |
| 10,641,885 | B2* | 5/2020 | Frick .................... G01S 13/588 |
| 11,495,030 | B1* | 11/2022 | Kimchi ................ B64C 39/024 |
| 2004/0267444 | A1 | 12/2004 | Coatantiec et al. |
| 2008/0243383 | A1* | 10/2008 | Lin ........................ G08G 5/045 |
| | | | 342/357.53 |
| 2016/0047657 | A1 | 2/2016 | Caylor et al. |
| 2018/0165591 | A1 | 6/2018 | Dunik et al. |
| 2019/0315485 | A1* | 10/2019 | Bolukbasi .............. B64D 25/00 |
| 2020/0025571 | A1 | 1/2020 | Skilton et al. |
| 2020/0111358 | A1* | 4/2020 | Parchami ............... G08G 1/056 |
| 2022/0041298 | A1* | 2/2022 | Schurek ................ B64D 45/08 |
| 2022/0258880 | A1* | 8/2022 | George ................ G05D 1/0676 |
| 2023/0092933 | A1* | 3/2023 | Cooper .................. G01S 7/417 |
| | | | 340/438 |

OTHER PUBLICATIONS

Ausman, "Baro-Inertial Loop for the USAF Standard RLG INU", Navigation: Journal of The Institute of Navigation, vol. 38, No. 2, Summer 1991, pp. 205-220, Published: US.

Braff, "Integrated GNSS/Altimeter Landing System", UIB GNSS 20th International Technical Meeting of the Satellite Division, 25-28, Sep. 2007, Fort Worth, TX, pp. 2934 through 2949, Published: US.

Riaz, "Investigation of a Third Order Baro-Damped Vertical Channel of INS MS Thesis" Dec. 1982, pp. 1 through viii and 1 through 148 (162 pages total), Published: US.

Seo, "A New Error Compensation Scheme for INS Vertical Channel", IFAC Automatic Control in Aerospace, 2004, pp. 1119 through 1124.

\* cited by examiner

RADAR ALTIMETER INERTIAL VERTICAL LOOP

BACKGROUND

Unmanned aircraft systems (UAS) for package delivery and air taxis in Urban Air Mobility (UAM) applications have demanding navigation requirements during landing to support non-certified pilots, automatic systems with potential oversight by remote pilots, and autonomous systems. For example, UAM applications require precision approach and landing to provide for passenger safety and comfort.

Vehicle vertical position and velocity requirements are extremely demanding for landing zone operations. A hybrid (or operational) mode of Global Positioning System (GPS) aided strapdown inertial navigation systems (INS) cannot satisfy such landing zone requirements without ground-based, differential GPS systems. These systems require power systems and landing zone maintenance personnel to maintain operations, and are subject to jamming.

The sensor sets of navigation systems for UAS or UAM applications have a need for additional aiding sensors to help satisfy the demanding navigation requirements. One such aiding sensor is the barometer, which has been incorporated into navigation systems using a dedicated vertical loop with complementary filter designs outside the navigation system's filter. This approach has various limitations in that estimation errors of vertical acceleration, and sensor measurement errors, are not used in complementary filter designs. Further, this system may not satisfy the vertical position requirements in the landing zone.

SUMMARY

A system to provide navigation solutions for landing guidance of a vehicle comprises one or more aiding sensors onboard the vehicle; an onboard inertial measurement unit (IMU) operative to produce inertial measurements for the vehicle; an onboard radar altimeter operative to produce radar altimeter measurements for the vehicle; and an onboard map database comprising one or more terrain and object maps. An onboard navigation system is operative to receive aiding data from the one or more aiding sensors and inertial data from the IMU. The navigation system includes a navigation filter operative to generate estimated kinematic state statistics for the vehicle based on the aiding data and the inertial data. At least one onboard processor is operative to execute processor readable instructions to perform a method comprising: inputting horizontal position statistics and vertical position statistics from the navigation filter into the map database; and computing an estimated ground/object height, an estimated ground/object velocity, an estimated ground/object acceleration, and error statistics thereof, based on terrain and object map data from the map database. The processer includes a radar altimeter inertial vertical loop (RIVL) filter that is operative to perform a method comprising: receiving the estimated ground/object height, the estimated ground/object velocity, the estimated ground/object acceleration, and the error statistics thereof; receiving radar altimeter measurements from the radar altimeter; determining a relative vertical acceleration based on a difference between a vehicle vertical acceleration and a ground/object vertical acceleration; determining a relative vertical velocity based on a difference between a vehicle vertical velocity and a ground/object vertical velocity; performing a consistency check on the relative vertical acceleration based on non-zero relative vertical acceleration conditions, and on conditions comparing an integrated relative vertical acceleration to the relative vertical velocity; performing a consistency check on the relative vertical velocity based on zero relative vertical acceleration conditions and non-zero relative vertical velocity conditions; and outputting estimated vertical position and vertical velocity statistics of the vehicle for compensation of estimated vertical position and vertical velocity statistics from the navigation filter. The navigation filter is configured to output the compensated estimated vertical position and vertical velocity statistics to provide landing guidance for the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for implementing a radar altimeter inertial vertical loop (RIVL) is described herein.

The present system includes use of a radar altimeter, ground maps, and optionally a barometer, to estimate vehicle vertical position and velocity statistics relative to a landing site, where the landing site can be on top of a building or on the ground. The radar altimeter is incorporated into a navigation system using a vertical loop mechanism. In another embodiment, the radar altimeter can be incorporated directly into the navigation system's filter to take advantage of the integrity structure of the navigation system, inertial measurement units (IMUs), and aiding sensors such as Global Positioning System (GPS) devices. The present approach incorporates sensor, map, and navigation errors into the vertical loop mechanism to improve its performance over standard vertical loops.

As described further hereafter, the vertical loop mechanism can be designed and implemented as a RIVL filter. The RIVL filter is used to fuse various measurements to estimate vertical position and velocity of a vehicle. The present approach provides various features in the RIVL filter, including incorporating maps of landing areas; modeling ground and ground objects (e.g., terrain features, buildings, etc.) using a logistics function; incorporating error models of the ground, ground structures, and sensors into the vertical loop design; and incorporating a switching input feature from relative vehicle vertical acceleration to relative vehicle vertical velocity during constant velocity descents over flat terrain.

The present method incorporates modeling errors of the ground and ground objects, plus sensor errors, to enable estimation of vertical position errors for integrity, continuity, and availability analysis. The RIVL filter can be used as a standalone system, or can be integrated into a navigation system filter.

During operation, the RIVL filter is used to track the vehicle altitude above an object level, $h_{AOL}$, from vehicle approach to landing. There are two contributions to changes in $h_{AOL}$, including vertical vehicle velocity/acceleration, and ground variations from the World Geodetic System (WGS)-84 surface. WGS-84 is a reference coordinate system used by GPS, and is defined by a standard reference ellipsoid model. A terrain/object map of a landing zone is used to develop ground/object height/velocity/acceleration data, where terrain/object height refers to altitude above the WGS-84 Earth's surface. Ground variations can arise from terrain features on the ground surface, and from buildings or infrastructure on the ground surface. The present method addresses map errors and the effects of estimated vehicle kinematic statistics on $h_{AOL}$, using the RIVL filter.

With respect to the terrain/object map, a preloaded map of a landing zone area includes fixed stationary and infrastructure objects. The RIVL filter operates using the fixed stationary and infrastructure objects. While the preloaded map of the landing zone area needs to be current, the preloaded map can be updated at the landing zone area by transmitting an updated map to an approaching vehicle.

The RIVL filter is particularly useful in UAS vehicles for package delivery, and in air taxis such as UAM vehicles. The RIVL filter enables vehicle navigation systems to satisfy UAS and UAM landing zone requirements for both package delivery and air taxi landings using the same approach. This allows for navigating UAS and UAM vehicles in traditional and non-traditional landing zones.

Further details related to the present system and method are described as follows and with reference to the drawings.

Figure 1A:
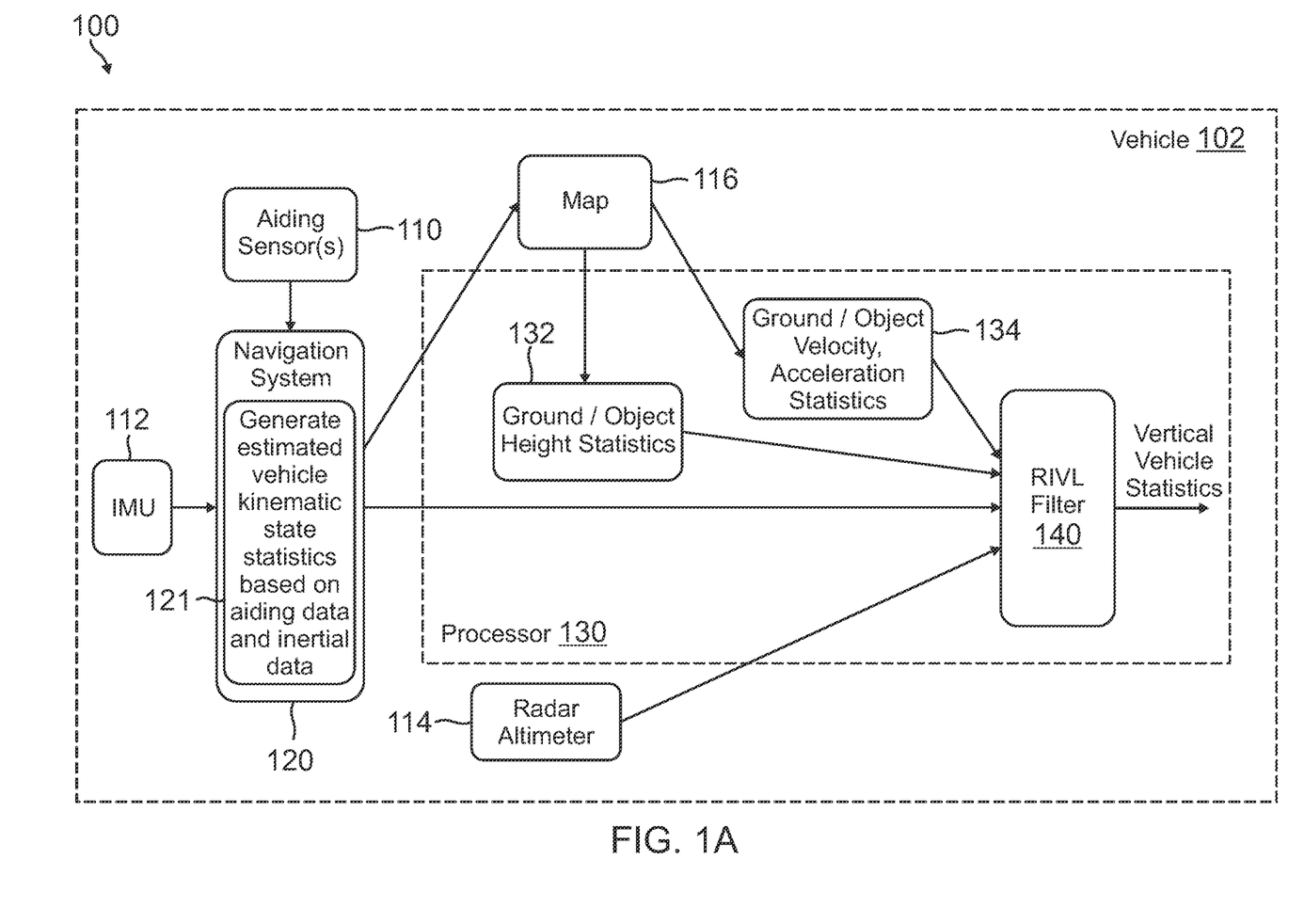
FIG. 1A is a block diagram of a system for implementing a radar altimeter inertial vertical loop (RIVL) filter, according to one embodiment.
Figure 1B:
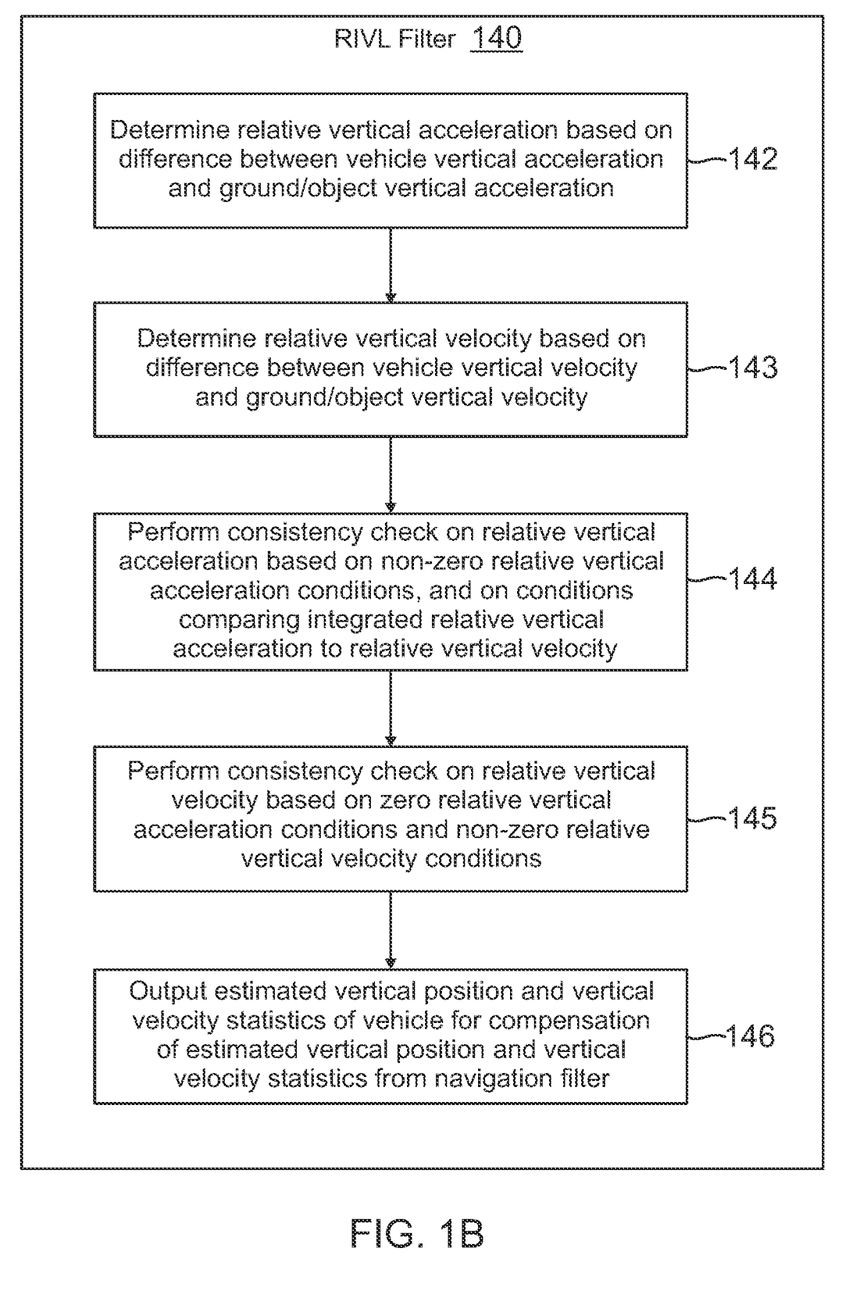
FIG. 1B is a flow diagram of a method for operating the RIVL filter in the system of FIG. 1A.

FIGS. 1A and 1B illustrate a system 100 for implementing a RIVL, according to one embodiment. The system 100 comprises one or more aiding sensors 110 onboard a vehicle 102; an onboard inertial measurement unit (IMU) 112 operative to produce inertial measurements for vehicle 102; and an onboard radar altimeter 114 operative to produce radar altimeter measurements for vehicle 102. A map database 116 onboard vehicle 102 comprises one or more terrain and object maps. An onboard navigation system 120 is configured to receive aiding data from aiding sensors 110, and inertial data from IMU 112. A navigation filter 121 of navigation system 120 is operative to generate estimated kinematic state statistics for vehicle 102 based on the aiding data and the inertial data.

A processor 130 onboard vehicle 102 is configured to input horizontal position statistics and vertical position statistics from navigation system 120 into map database 116. The processor 130 is operative to compute, based on terrain and object map data from map database 116, an estimated ground/object height and error statistics thereof (block 132); and an estimated ground/object velocity, estimated ground/object acceleration, and error statistics thereof (block 134).

As depicted in FIG. 1A, processer 130 includes a RIVL filter 140 that is configured to receive the estimated ground/object height and error statistics thereof (from block 132); and the estimated ground/object velocity, estimated ground/object acceleration, and error statistics thereof (from block 134). The RIVL filter 140 is also configured to receive radar altimeter measurements from radar altimeter 114. The RIVL filter 140 is also configured to receive vertical vehicle acceleration and velocity statistics from navigation system 120. The RIVL filter 140 is operative to calculate and output estimated vertical statistics for vehicle 102 for landing guidance.

For example, as shown in FIG. 1B, RIVL filter 140 is generally operative to execute processor readable instructions to determine a relative vertical acceleration based on a difference between a vehicle vertical acceleration and a ground/object vertical acceleration block (142); determine a relative vertical velocity based on a difference between a vehicle vertical velocity and a ground/object vertical velocity (block 143); perform a consistency check on the relative vertical acceleration based on non-zero relative vertical acceleration conditions, and on conditions comparing an integrated relative vertical acceleration to the relative vertical velocity (block 144); and perform a consistency check on the relative vertical velocity based on zero relative vertical acceleration conditions and non-zero relative vertical velocity conditions (block 145). The RIVL filter 140 then outputs estimated vertical position and vertical velocity statistics of vehicle 102 for compensation of estimated vertical position and vertical velocity statistics from navigation filter 121 (block 146). The navigation filter 121 is configured to output the compensated estimated vertical position and vertical velocity statistics to provide landing guidance for vehicle 102.

Figure 2:
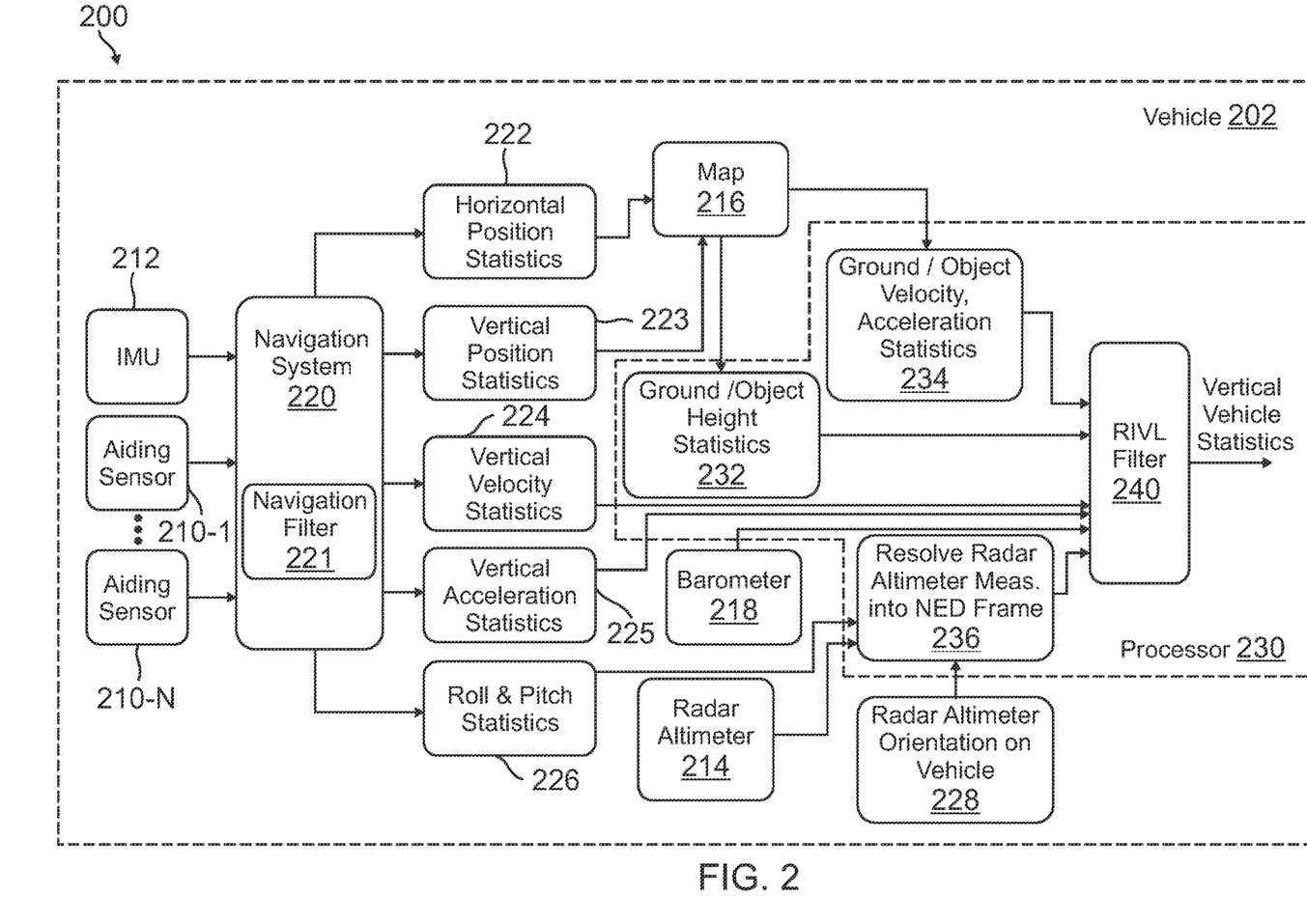
FIG. 2 is a block diagram of a system for implementing a RIVL filter, according to another embodiment.

FIG. 2 illustrates a system 200 for implementing a RIVL, according to another embodiment. The system 200 comprises a set of aiding sensors 210-1, . . . 210-N onboard a vehicle 202; an onboard IMU 212 operative to produce inertial measurements for vehicle 202; and an onboard radar altimeter 214 operative to produce radar altimeter measurements for vehicle 202. Examples of the aiding sensors include a GPS receiver, a camera, a light detection and ranging (LiDAR) device, a radar device, or the like.

A map database 216 onboard vehicle 202 comprises one or more terrain and object maps. For example, the terrain and object maps can include a local ground level map with altitude above the WGS-84 ellipsoid, and an object map with object altitude above the local ground level. An onboard barometer 218 is configured to produce barometric pressure measurements for vehicle 202.

An onboard vehicle navigation system 220 is configured to receive aiding data from aiding sensors 210-1 to 210-N and inertial data from IMU 212. A navigation filter 221 of navigation system 220 is operative to generate estimated kinematic state statistics for vehicle 202 based on the aiding data and the inertial data. In particular, navigation filter 221 is configured to compute and output: horizontal position and standard deviation of the horizontal position estimates (horizontal position statistics) at 222; vertical position and standard deviation of the vertical position estimates (vertical position statistics) at 223; vertical velocity and standard deviation of the vertical velocity estimates (vertical velocity statistics) at 224, and vertical acceleration and standard deviation of the vertical acceleration estimates (vertical acceleration statistics) at 225. In addition, navigation filter 221 is configured to compute and output roll and pitch statistics at 226, which provide three-dimensional (3D) angular orientation and standard deviation of the angular orientation estimates for vehicle 202.

The map database 216 is configured to receive the horizontal position and standard deviation of the horizontal position estimates (from 222) and the vertical position and standard deviation of the vertical position estimates (from 223) from navigation system 220. An onboard processor 230 is operative to compute, based on terrain/object data from map database 216 and the position statistics, an estimated ground/object height and standard deviation thereof (block 232); and an estimated ground/object velocity, estimated ground/object acceleration, and standard deviation thereof (block 234). These are used for ground modeling, which is described in further detail hereafter.

As depicted in FIG. 2, processer 230 includes a RIVL filter 240, which is configured to receive ground modeling data based on the estimated ground/object height statistics thereof (from block 232); and ground modeling data based on the estimated ground/object velocity statistics and estimated ground/object acceleration statistics thereof (from block 234). The RIVL filter 240 is also configured to receive the vertical velocity statistics (from 224), the vertical acceleration statistics (from 225), and barometric pressure measurements from barometer 218.

In addition, the roll/pitch statistics (from block 226), the radar altimeter measurements from radar altimeter 214, and a radar altimeter angular orientation on vehicle 202 (block 228) are fed to processor 230. The radar altimeter angular orientation on vehicle 202 has known measurement axes, and a direction cosine matrix from the radar altimeter measurement frame to the vehicle body axes is known. The processor 230 is configured to resolve the radar altimeter measurements into a local horizontal local vertical reference frame, such as a north-east-down (NED) frame (block 236), which is then fed to RIVL filter 240.

The RIVL filter 240 is operative to calculate and output estimated vertical statistics for vehicle 202 for landing guidance, based on a fusion of all the received input data, as described in further detail hereafter.

Figure 3:
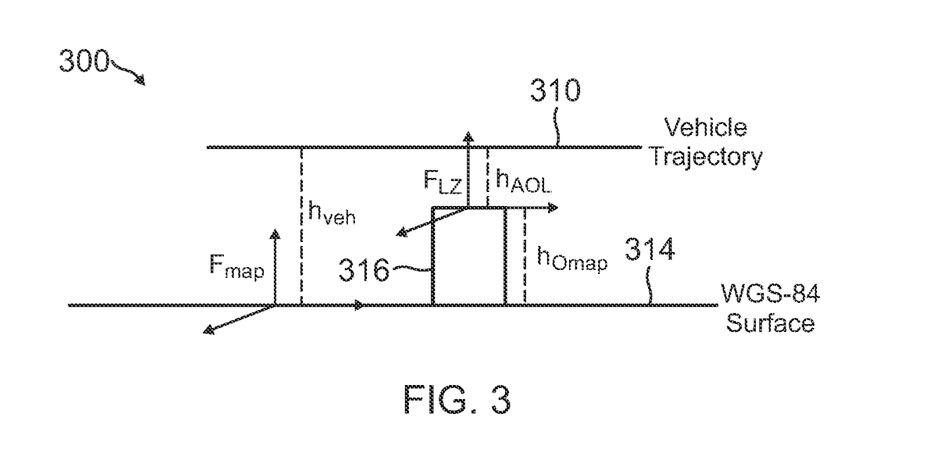
FIG. 3 is a schematic representation of an exemplary operating environment for a vehicle implemented with a RIVL filter.

FIG. 3 is a schematic representation of an exemplary operating environment 300 for a vehicle such as a UAM or UAS, implemented with a RIVL filter. As shown, a vehicle trajectory 310 is above a WGS-84 surface 314 and an object 316 such as a building. Various parameters are also shown, including:

$h_{veh}$≡vehicle altitude above WGS-84 ellipsoid;
$h_{Omap}$≡object altitude above WGS-84 ellipsoid; and
$h_{AOL}$≡vehicle altitude above object level.

These parameters have the following relationship:

$$h_{veh} = h_{map} h_{AOL}.$$

In addition, $F_{map}$ represents a local horizontal-local vertical reference frame with origin at the WGS-84 surface 314, and $F_{LZ}$ represents a local horizontal-local vertical reference frame with origin located at the UAM or UAS landing zone, which in this case is on top of object 316. The altitude $h_{Omap}$ represents the height of the origin of frame $F_{LZ}$ relative to the origin of frame $F_{map}$.

Figure 4:
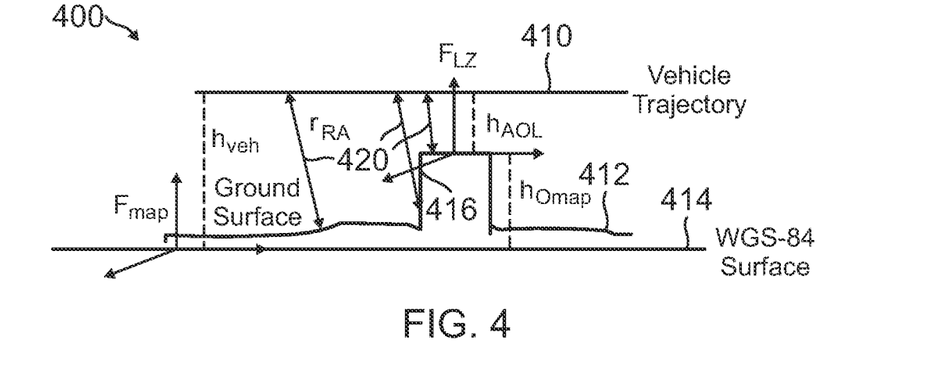
FIG. 4 is a schematic representation of another exemplary operating environment for a vehicle implemented with a RIVL filter.

FIG. 4 is a schematic representation of another exemplary operating environment 400 for a vehicle implemented with the RIVL filter, in which a vehicle trajectory 410 is above a ground surface 412, which is deviated from a WGS-84 surface 414. The ground surface 412 can be above the WGS-84 surface 414, at the WGS-84 surface 414, or below the WGS-84 surface. In this example, the ground surface 412 is elevated above the WGS-84 surface 414. An object 416 such as a building has its base located on the ground surface 412. Various parameters are also shown, including $h_{veh}$, $h_{Omap}$, and $h_{AOL}$, along with $F_{map}$ and $F_{LZ}$, which are described above with respect to FIG. 3.

A radar altimeter measurement, $h_{RA,m}$, is a radar altimeter measured range 420, $r_{RA}$, to ground surface 412 and object 416 along a boresight of an onboard radar altimeter as the vehicle travels. As shown in FIG. 4, the range measurement may not always be made to ground surface 412 or the top of object 416. Depending on the location and angular orientation of the vehicle, a range measurement can be made to the side of object 416.

When a barometer is used with the RIVL filter, a barometer measurement, $h_{b,m}$, measures the vehicle altitude, $h_{veh}$, above WGS-84 surface 414. The terrain/object maps used with the RIVL filter provide the ground/object altitude, $h_{Omap}$, above WGS-84 surface 414 based on an estimated vehicle position, $\tilde{h}_{Omap}$.

Additional details related to implementing the RIVL filter are described as follows.

Ground Modeling

The objective of ground modeling is to approximate the ground elevation changes and stationary objects on the ground as ground velocities and ground accelerations. The ground and stationary objects can be modeled as either steps or ramps. The step modeling can be for buildings, trees, and other objects. The ramp modeling can be for ground elevation changes. The present method approximates steps and ramps using a differentiable function to estimate ground velocity and acceleration.

The ground/object model function needs to be twice differentiable ($C^2$ continuity). In this regard, a general logistics function (sigmoid curve) can be employed as it is a twice differentiable function. The general logistics function can be expressed as:

$$f(x) = \frac{L}{1 + e^{-k(x-x_0)}}$$

where:
L≡maximum value of curve;
$x_0$≡horizontal mid-point of curve; and
k≡growth rate of curve.

In one example of a step approximation using a logistics function:
L≡building/tree height; and
k≡steepness of curve.

Figure 5:
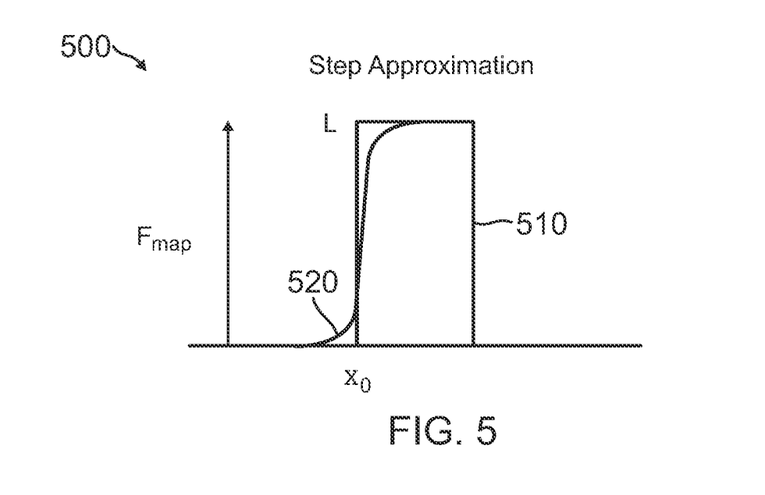
FIG. 5 is a graphical representation of a step approximation using a logistics function, which can be implemented in a RIVL filter.

FIG. 5 is a graphical representation 500 of a step approximation using a logistics function, such as for a building 510. As shown, L is height of building 510, with respect to $F_{map}$, and $x_0$ represents the mid-point of a curve 520, which represents the logistics function.

In one example of a ramp approximation using a logistics function:
L≡ground elevation change from local level to the top of the ramp; and
k≡slope of ramp.

Logistics Function and Step Function

The logistics function provides a good approximation of the heavyside step function, which is a good approximation for buildings. For example, assume: L=1, k=1, and $x_0$=0 so that the logistics function can be written as:

$$f(x) = \frac{1}{1+e^{-kx}}.$$

The logistics function is computed as follows:

$$\tanh(x) = \frac{e^x - e^{-x}}{e^x + e^{-x}} = 2f(2x) - 1;$$

$$f(2x) = \frac{1}{2}\tanh(x) + \frac{1}{2}.$$

In the Heavyside step function:

$$H(k) = \begin{cases} 0, k < 0 \\ 1, k \geq 0 \end{cases};$$

and the analytical approximation is:

$$H(x) \sim \frac{1}{2} + \frac{1}{2}\tanh(kx) = \frac{1}{1+e^{-2kx}}.$$

Ground Height, Velocity, and Acceleration

Initially, vehicle horizontal position statistics output at 222 (FIG. 2) are obtained from vehicle navigation system 220. An unscented transform is used to compute ground/object height, velocity, acceleration, and their error statistics from the map and the horizontal position statistics from 222.

In an example implementation, unscented transform weighting parameters are selected, and sigma points for the vehicle position statistics are formulated. For each sigma point, the horizontal vehicle position is correlated to a landing zone map position: $x_i$, and parameters of ground features are selected based on the map: $L_i$, $k_i$, and $x_{0,i}$. For each sigma point, a ground height is computed as:

$$h_{Omap,i} = f(x_i) = \frac{L_i}{1+e^{-k_i(x_i-x_{0,i})}};$$

a ground velocity is computed as:

$$V_{gnd,i} = f'(x_i) = k_i L_i e^{-k_i(x_i-x_{0,i})}(1+e^{-k_i(x_i-x_{0,i})})^{-2}; \text{ and}$$

a ground acceleration is computed as:

$$A_{gnd,i} = f''(x_i) = k_i^2 L_i e^{-k_i(x_i-x_{0,i})}(1+e^{-k_i(x_i-x_{0,i})})^{-2}(-1+2e^{-k_i(x_i-x_{0,i})}(1+e^{-k_i(x_i-x_{0,i})})^{-1}).$$

The ensemble statistics are then formulated using these expressions to compute:
ground/object height: $h_{Omap}$ and $\delta h_{Omap}$;
ground/object velocity: $V_{gnd}$ and $\delta V_{gnd}$; and
ground/object acceleration: $A_{gnd}$ and $\delta A_{gnd}$.

The ground/object height, velocity, and acceleration error terms are dependent on the vehicle horizontal estimation errors.

Figure 6:
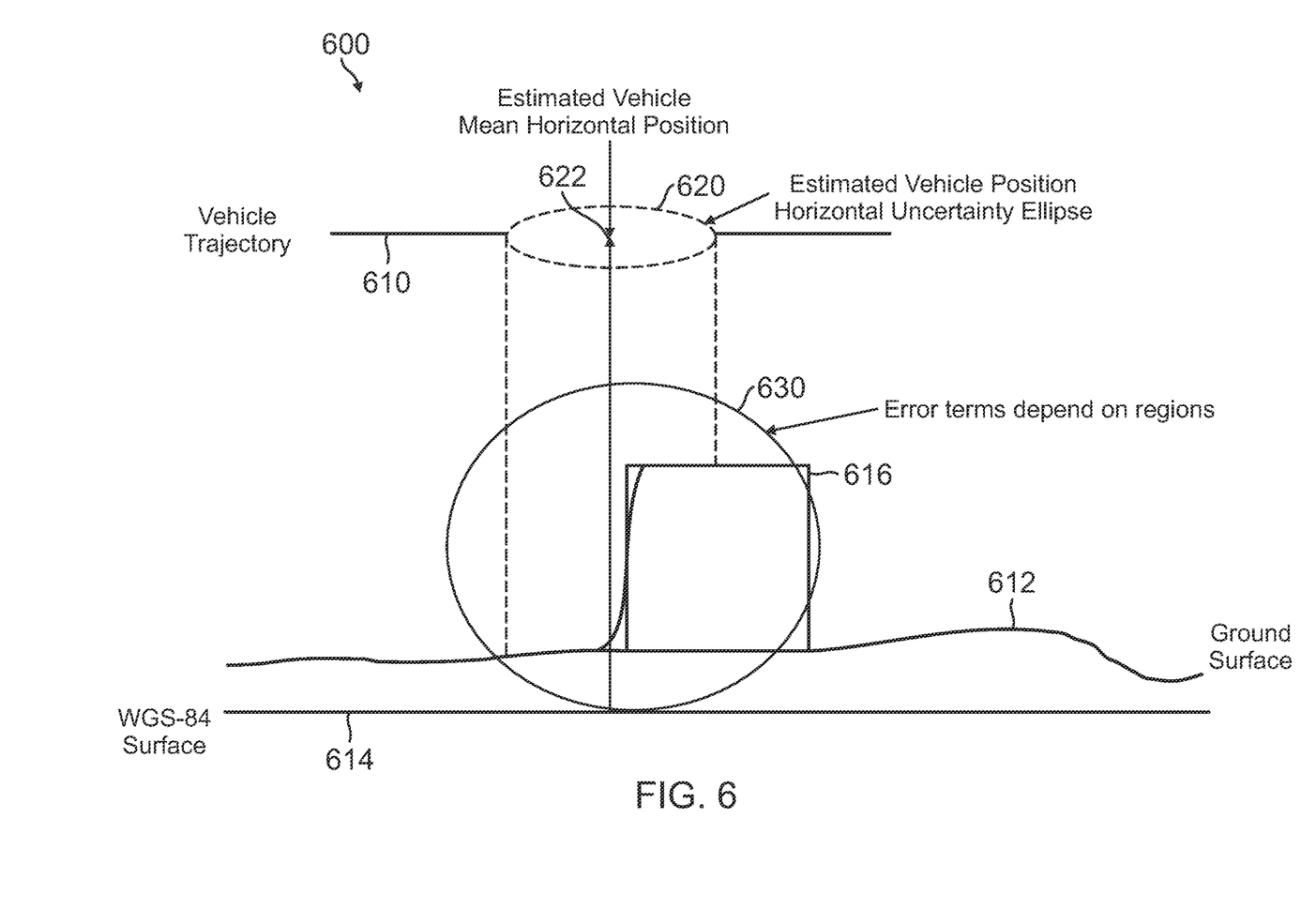
FIG. 6 is a schematic representation of ground and vehicle position errors in an example operating environment for a vehicle implemented with a RIVL filter.

FIG. 6 is a schematic representation of ground and vehicle position errors in an example operating environment 600 for a vehicle implemented with a RIVL filter. As shown, a vehicle trajectory 610 is above a ground surface 612, which is elevated over a WGS-84 surface 614. An object 616 such as a building is located on ground surface 612. Also shown is an estimated vehicle position horizontal uncertainty ellipse 620 and an estimated vehicle mean horizontal position 622, both of which are provided by vehicle navigation system 220. The ground/object height, $h_{Omap}$, and the ground/object height uncertainties, $\delta h_{Omap}$, are determined from the projections of both the estimated vehicle mean horizontal position 622 and estimated vehicle position horizontal uncertainty ellipse 620, as indicated at 630. The projection of the estimated vehicle position horizontal uncertainty ellipse 620 on the map can include both the top of object 616 as well as ground surface 612. The ground/object height uncertainty, $\delta h_{Omap}$, is then a function of different ground terrain (ground surface and/or top of object) and uncertainties of the ground surface height and object height within the map itself.

RIVL Filter Design

The RIVL filter is implemented as a two-input system, which provides input switching and consistency checks. The inputs include relative vertical velocity/acceleration, and vertical position of the vehicle. The relative vertical velocity, $V_{in}$, is defined as: (vehicle vertical velocity)−(ground/object vertical velocity). The relative vertical acceleration, $A_{in}$, is defined as (vehicle vertical acceleration)−(ground/object vertical acceleration).

The RIVL filter is designed to maintain vertical velocity/acceleration and vertical position inputs consistent with the vehicle's operating environment. A changing vertical position can occur with constant relative vertical velocity such that there is zero relative vertical acceleration. In this case, the RIVL filter can switch to relative vertical velocity inputs to improve its performance.

Figures 7A, 7B:
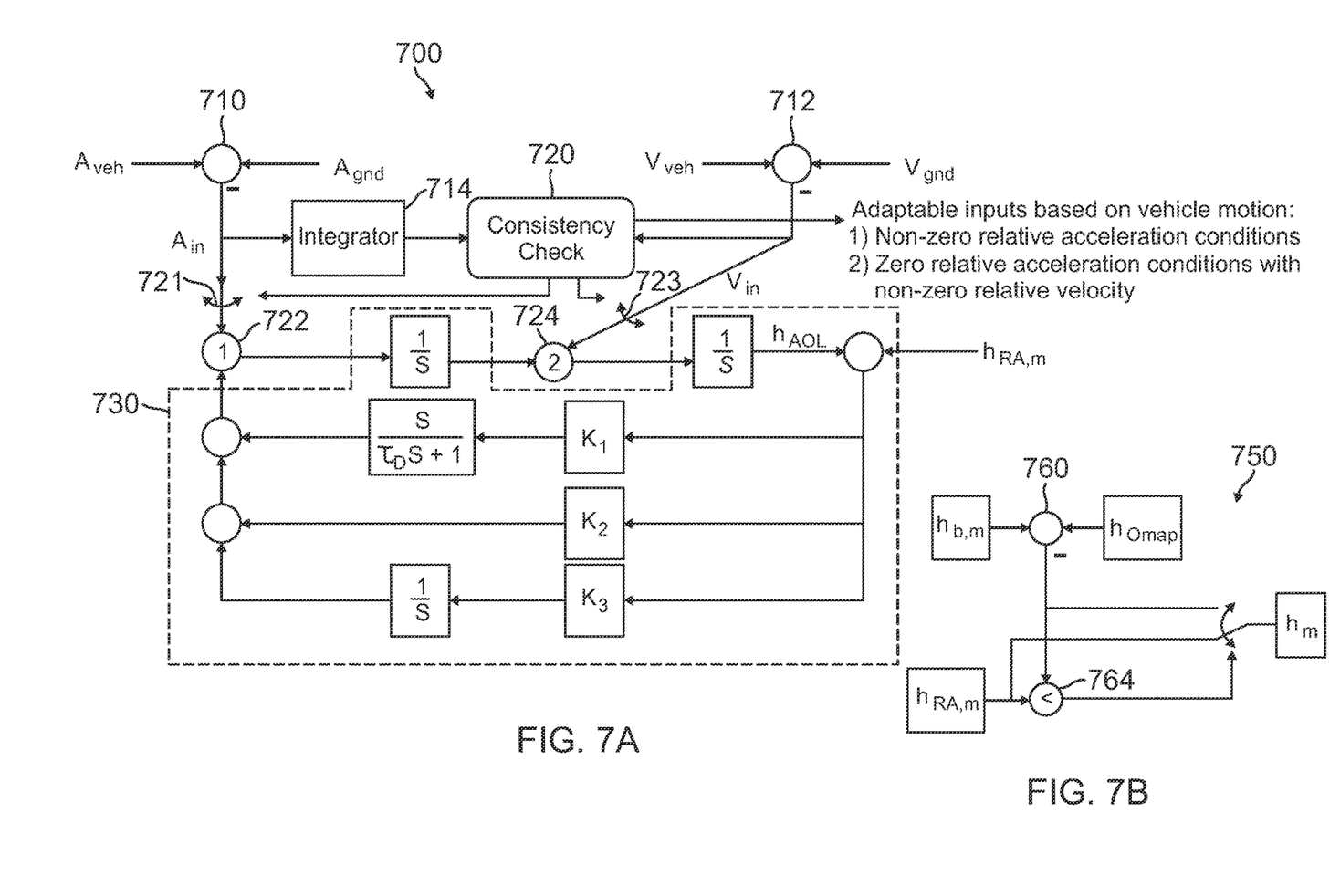
FIG. 7A is a block diagram of a RIVL filter, according to one implementation.
FIG. 7B is a block diagram of an optional consistency check used for radar altimeter measurements in the RIVL filter of FIG. 7A.

FIG. 7A illustrates an exemplary design for a RIVL filter 700, implemented in the frequency domain. As shown, a first subtractor 710 is configured to receive a vehicle vertical acceleration, $A_{veh}$, a ground/object vertical acceleration, $A_{gnd}$, and to output the difference as a relative vertical acceleration, $A_{in}$. A second subtractor 712 is configured to receive a vehicle vertical velocity, $V_{veh}$, a ground/object vertical velocity, $V_{gnd}$, and to output the difference as a relative vertical velocity, $V_{in}$. The relative vertical acceleration, $A_{in}$, and the relative vertical velocity, $V_{in}$, are then fed to a complementary filter that is adaptable to use either input for further processing.

The complementary filter includes a consistency check module 720 and a third order loop 730 that operatively communicates with consistency check module 720 and that is adaptable to use either input. The inputs are based on vehicle motion, including non-zero relative acceleration conditions, and zero relative acceleration conditions with non-zero relative velocity conditions. The third order loop 730 includes a set of feedback control gains ($K_1$, $K_2$, and $K_3$), along with various operators $$\left(\frac{1}{s}, \frac{s}{\tau_D s + 1}\right)$$

and is operative to damp or control the instability of exponentially increasing vertical channel errors in navigation filter designs.

The consistency check module 720 includes a set of consistency checks that determine whether third order loop 730 uses either the relative vertical acceleration, $A_{in}$, or the relative vertical velocity, $V_{in}$. A first consistency check can be expressed as:

$$\left| \sum_{i=k-N}^{k} [t_i - (t_i - 1)](A_{in,i} - A_{in,i-1}) \right| > \varepsilon_1$$

$$\left| V_{in,k} - \sum_{i=k-N}^{k} [t_i - (t_i - 1)](A_{in,i} - A_{in,i-1}) \right| < \varepsilon_2$$

where N is a user selected number of time steps ($t_i$), $\varepsilon_1$ is a user selected threshold to determine if there is non-zero relative vertical velocity with inputs of relative vertical acceleration integrated over N time steps, and $\varepsilon_2$ is a user selected threshold to determine if the relative vertical velocity is consistent with the integrated vertical velocity. If the first consistency check is satisfied, then the third order loop 730 uses the relative vertical acceleration. If the first consistency check is not satisfied, then a second consistency check is used to determine whether relative vertical velocity should be used by third order loop 730. The second consistency check can be expressed as:

$$|V_{in,k}| > \varepsilon_3,$$

where $\varepsilon_3$ is a user selected threshold to determine if there is non-zero relative vertical velocity. If the second consistency check is satisfied, then the third order loop 730 uses the relative vertical velocity as an input. If the second consistency check is not satisfied, then third order loop 730 uses a zero relative vertical acceleration as an input.

During operation, the computed relative vertical acceleration, $A_{in}$, is sent to an integrator 714, which integrates $A_{in}$ to obtain the corresponding integrated vertical velocity, which is sent to consistency check module 720. The computed relative vertical velocity, $V_{in}$, is also sent to consistency check module 720. Two consistency checks are then performed using integrated $A_{in}$ and the relative vertical velocity, $V_{in}$. If the first consistency check passes, then the relative vertical acceleration, $A_{in}$, is directed by a first adaptable input switch 721 to a first input 722 and processed by third order loop 730. If the first consistency check fails and the second consistency check passes, then the relative vertical velocity, $V_{in}$, is directed by a second adaptable input switch 723 to a second input 724 and processed by third order loop 730. If both consistency checks fail, then a zero relative vertical acceleration, $A_{in}$, is directed to first input 722 and processed by third order loop 730.

FIG. 7B is a block diagram of a consistency check 750 used for the radar altimeter measurement, $h_{RA,m}$, when a barometer is employed as an aiding sensor. A subtractor 760 is configured to receive a barometer measurement, $h_{b,m}$, and a ground/object altitude above the WGS-84 ellipsoid, $h_{Omap}$, and to output a difference value to a comparator 764. If the difference value is not consistent with the radar altimeter measurement, $h_{RA,m}$, then the radar altimeter measurement is not used as an input to third order loop 730 (FIG. 7A). If the difference value is consistent with the radar altimeter measurement, then the radar altimeter measurement is used as an input to the third order loop 730.

Figure 8:
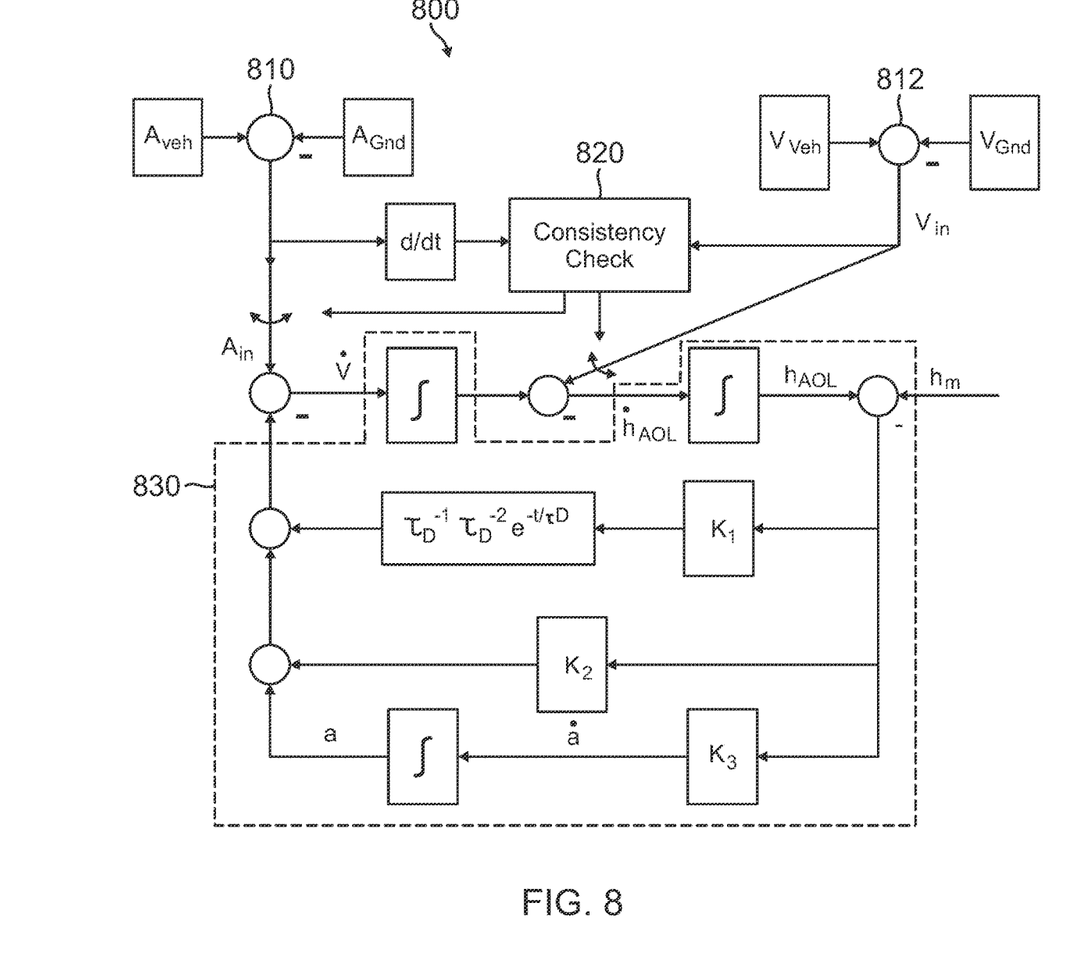
FIG. 8 is a block diagram of a RIVL filter, according to another implementation.

In order to provide for modeling and use with a Kalman filter, the design of the RIVL filter in the frequency domain (FIG. 7A) needs to be transitioned to the time domain. FIG. 8 illustrates such a RIVL filter design 800 that is implemented in the time domain. Correspondingly, a first subtractor 810 is configured to receive the vehicle vertical acceleration, $A_{veh}$, the ground/object vertical acceleration, $A_{gnd}$, and to output the difference as a relative vertical acceleration, $A_{in}$. A second subtractor 812 is configured to receive the vehicle vertical velocity, $V_{veh}$, the ground/object vertical velocity, $V_{gnd}$, and to output the difference as a relative vertical velocity, $V_{in}$. The relative vertical acceleration and the relative vertical velocity are then fed to adaptable inputs of the filter section for further processing.

The filter section again includes a consistency check module 820 and a third order loop 830 that operatively communicates with the adaptable inputs. The third order loop section 830 includes a set of feedback control gains ($K_1$, $K_2$, and $K_3$), along with various time domain operators. The consistency check module 820 again includes a first consistency check that is provided for non-zero relative vertical acceleration, with an input of relative vertical acceleration; and a second consistency check that is provided for near-zero relative vertical acceleration as defined by a user selected threshold and non-zero relative vertical velocity, with inputs of relative vertical acceleration and relative vertical velocity. A consistency check can also be used for the radar altimeter measurement when a barometer is employed as an aiding sensor, such as shown in FIG. 7B.

Further details related to various models for use of the RIVL filter with a Kalman filter are described as follows.

Transition to Filter Models

The following equations can be used to provide a transition to filter models in the RIVL filter.

$$h_{AOL} = V_{in} + V;$$

$$\dot{V} = A_{in} - K_2(h_{AOL} - h_m) - K_1\left(\frac{1}{\tau_D} - \frac{1}{\tau_D^2}e^{-t/\tau_D}\right)(h_{AOL} - h_m) - a;$$

$$\dot{a} = K_3(h_{AOL} - h_m);$$

$$T_{\tau D} = \frac{1}{\tau_D} - \frac{1}{\tau_D^2}e^{-t/\tau_D};$$

$$\overline{K} = K_2 + K_1 T_{\tau D};$$

$$\dot{V} = A_{in} - \overline{K}(h_{AOL} - h_m) - a.$$

$$\delta h_{AOL} = \delta V_{in} + \delta V;$$

$$\delta \dot{V} = \delta A_{in} - \overline{K}(\delta h_{AOL} - \delta h_m) - \delta a;$$

$$\delta \dot{a} = K_3(\delta h_{AOL} - \delta h_m);$$

where:

$$\delta h_{AOL} = h_{AOL} - E\{h_{AOL}\};$$

$$\delta V = V - E\{V\};$$

$$\delta a = a - E\{a\};$$

$$\delta h_m = h_m - E\{h_m\};$$

$$\delta V_{in} = V_{in} - E\{V_{in}\}; \text{ and}$$

$$\delta A_{in} = A_{in} - E\{A_{in}\}.$$

Sensor Models

A barometer model, which provides vehicle height above the WGS-84 ellipsoid, can expressed by the following equations:

$h_{b,m} = h_{veh} + b_b + S_b h_{veh} + v_b;$ $\dot{b}_b = -\frac{1}{\tau_b} b_b + w_b;$ $\dot{S}_b = w_{Sb};$ where $b_b \equiv$ barometer bias;

$E\{b_b(t)\}=0;$ $E\{b_b(t)b_b(\tau)\}=\sigma_b^2 \exp(t-\tau);$ where $w_b \equiv$ barometer bias, driving white noise; and $v_b \equiv$ barometer, measurement white noise;

$E\{v_{Sb}(t)\}=0;$ $E\{v_{Sb}(t)v_{Sb}(\tau)\}=\sigma_{wb}^2 \delta(t-\tau);$ where $w_{Sb} \equiv$ barometer scale factor, driving white noise;

$E\{w_{Sb}(t)\}=0;$ $E\{w_{Sb}(t)w_{Sb}(\tau)\}=\sigma_{Sb}^2 \delta(t-\tau).$

A map model, which provides object height above the WGS-84 ellipsoid, can be expressed by the following equation:

$\tilde{h}_{Omap} = h_{Omap} v_{map};$ where $v_{map} \equiv$ uncertainty, object height on map, based on map error. The statistics of $v_{map}$ can be selected in multiple ways.

For the radar altimeter measurement consistency check, the height above object level, $h_m$, is equal to the barometer measurement, $h_{b,m}$, minus the map measurement, $\tilde{h}_{Omap}$ expressed as:

$h_m = h_{b,m} - \tilde{h}_{Omap} = h_{veh} - h_{Omap} + b_b + S_b h_{veh} + v_b - v_{map}.$ The radar altimeter measurement, $h_{RA,m}$, can be expressed by the following equations:

$h_{RA,m} = r_{RA} + v_{RA};$ $E\{v_{RA}(t)\}=0;$ $E\{v_{RA}(t)v_{RA}(\tau)\}=\sigma_{RA}^2 \delta(t-\tau).$ The following additional equations for the $h_{AOL} - h_m$ term can be used in the transition to filter models in the RIVL filter.

$h_{AOL} - h_m = h_{AOL} - h_{veh} + h_{Omap} - b_b - S_b h_{veh} - v_b + v_{map};$ $h_{AOL} - h_m - E\{h_{AOL} - h_m\} = \delta h_{AOL} - \delta h_m;$ $E\{h_{AOL} - h_m\} = E\{h_{AOL}\} - E\{h_{veh}\} + E\{h_{Omap}\} - E\{S_b h_{veh}\};$ $\delta h_{AOL} - \delta h_m = \delta h_{AOL} - \delta h_{veh} + \delta h_{Omap} - b_b - S_b h_{veh} + \{S_b h_{veh}\} - v_b + v_{map}$ $\sim \delta h_{AOL} - \delta h_{veh} + \delta h_{Omap} - b_b - S_b \delta h_{veh} - v_b + v_{map}.$ Dynamic Model The following equations can be used to provide a dynamic model for the RIVL filter.

$\delta \dot{h}_{AOL} = \delta V + \delta V_{in};$ $\delta \dot{V} = \delta A_{in} - \overline{K}(\delta h_{AOL} - \delta h_{veh} + \delta h_{Omap} - b_b - \delta h_{veh} S_b - v_b + v_{map}) - \delta a;$ -continued $\delta \dot{a} = K_3(\delta h_{AOL} - \delta h_{veh} + \delta h_{Omap} - b_b - \delta h_{veh} S_b - v_b + v_{map});$ $\begin{bmatrix} \delta \dot{h}_{AOL} \\ \delta \dot{V} \\ \delta \dot{a} \\ \dot{b}_b \\ \dot{S}_b \end{bmatrix} = \begin{bmatrix} 0 & 1 & 0 & 0 & 0 \\ -\overline{K} & 0 & -1 & \overline{K} & \delta h_{veh} \overline{K} \\ K_3 & 0 & 0 & -K_3 & -\delta h_{veh} K_3 \\ 0 & 0 & 0 & -1/\tau_b & 0 \\ 0 & 0 & 0 & 0 & 0 \end{bmatrix} \begin{bmatrix} \delta h_{AOL} \\ \delta V \\ \delta a \\ b_b \\ S_b \end{bmatrix}$ $+ \begin{bmatrix} 0 & 0 & 0 & 1 & 0 & 0 & 0 \\ \overline{K} & -\overline{K} & -\overline{K} & 0 & 1 & 0 & \overline{K} & 0 \\ -K_3 & K_3 & K_3 & 0 & 0 & 0 & -K_3 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} \delta h_{veh} \\ \delta h_{Omap} \\ v_{map} \\ \delta V_{in} \\ \delta A_{in} \\ w_b \\ v_b \\ w_{Sb} \end{bmatrix}$ or, in summary:

$\delta \dot{X} = \Phi \delta X + \Gamma W$

Dynamic Model—Error Terms

Figure 9:
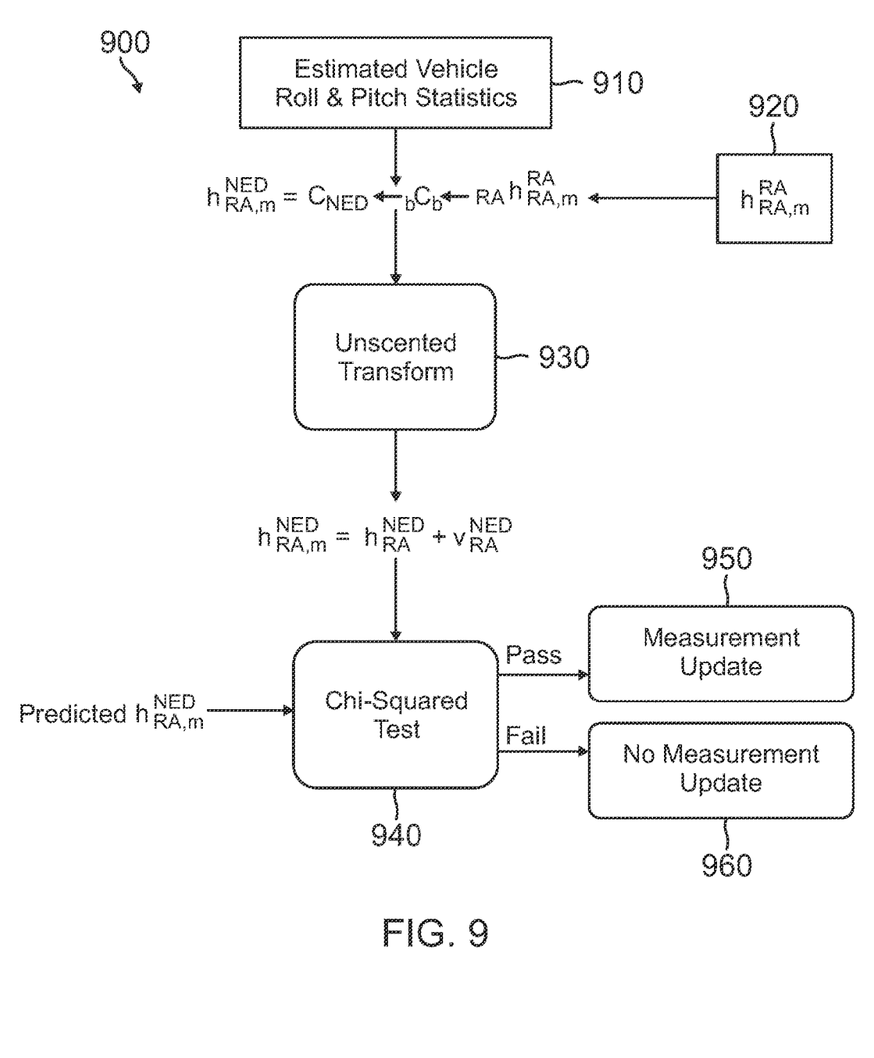
FIG. 9 is a flow diagram of an example operational method for a measurement model that can be employed in a RIVL filter.

The selection of uncertainty values can be done in multiple ways for the dynamic model. The contributing sources of error can be from the navigation filter, such as estimated vehicle height statistics computed by the navigation filter, and estimated vehicle vertical velocity statistics computed by navigation filter. Other sources of error can be from the computed ground velocity and ground acceleration. Examples of error terms include:

$\delta h_{veh} \equiv$ uncertainty, vehicle height above WGS-84 surface;

$\delta V_{in} \equiv$ uncertainty, relative vehicle vertical velocity $= \delta V_{veh} - \delta V_{gnd};$ $\delta A_{in} \equiv$ uncertainty, relative vehicle vertical acceleration $= \delta A_{veh} - \delta A_{gnd}.$ Measurement Model FIG. 9 is a flow diagram of an example operational method 900 for a measurement model that can be employed in the RIVL filter. Initially, estimated vehicle roll and pitch statistics (block 910) are received from a vehicle navigation system, along with vehicle radar altimeter measurements, $h_{RA,m}^{RA}$, (block 920), which are resolved into a NED frame, expressed as:

$h_{RA,m}^{NED} = C_{NED \leftarrow b} C_{b \leftarrow RA} h_{RA,m}^{RA}.$

An unscented transform is then performed (block 930) which outputs the radar altimeter measurements in the NED frame, expressed as:

$h_{RA,m}^{NED} = h_{RA}^{NED} + v_{RA}^{NED}.$

A chi-squared test is then performed based on a predicted $h_{RA,m}^{NED}$ and the measured $h_{RA,m}^{NED}$ (block 940). If the chi-squared test is passed, then a measurement update is carried out (block 950). If the chi-squared test is failed, then there is no measurement update (block 960).

The following equations can be used to provide the measurement model in the RIVL filter.

$h_{RA,m}^{RA} = h_{RA}^{RA} + v_{RA}^{RA};$ $E\{v_{RA}^{RA}\} = 0;$ $E\{v_{RA}^{RA,2}\} = R_{RA};$ $h_{RA,m}^{NED} = h_{RA}^{NED} + v_{RA}^{NED};$ $E\{v_{RA}^{NED}\} = 0;$

-continued $$E\{v_{RA}^{NED,2}\} = \overline{R}_{RA};$$

$$y_m = h_{RA}^{NED} + v_{RA}^{NED} - E\{h_{RA}^{NED}\} = \begin{bmatrix} 1 & 0 & 0 & 0 & 0 \end{bmatrix} \begin{bmatrix} \delta h_{AOL} \\ \delta V \\ \delta a \\ \delta b_b \\ \delta S_b \end{bmatrix} + v_{RA}^{NED}$$

or, in summary:

$$y_m = H\delta X + v_{RA}^{NED}$$

The dynamic model and measurement model described above are then used to estimate the vehicle's vertical velocity and position error statistics by a RIVL Kalman filter. These error statistics are used to compensate the vertical position (altitude) and vertical velocity statistics computed by the navigation filter. The Kalman filter is well known to those skilled in the art.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system comprising: one or more aiding sensors onboard a vehicle; an onboard inertial measurement unit (IMU) operative to produce inertial measurements for the vehicle; an onboard radar altimeter operative to produce radar altimeter measurements for the vehicle; an onboard map database comprising one or more terrain and object maps; an onboard navigation system operative to receive aiding data from the one or more aiding sensors and inertial data from the IMU, the navigation system including a navigation filter operative to generate estimated kinematic state statistics for the vehicle based on the aiding data and the inertial data; and at least one processor onboard the vehicle, the at least one processor operative to execute processor readable instructions to perform a method comprising: inputting horizontal position statistics and vertical position statistics from the navigation filter into the map database; and computing an estimated ground/object height, an estimated ground/object velocity, an estimated ground/object acceleration, and error statistics thereof, based on terrain and object map data from the map database; wherein the at least one processer includes a radar altimeter inertial vertical loop (RIVL) filter, wherein the RIVL filter is operative to perform a method comprising: receiving the estimated ground/object height, the estimated ground/object velocity, the estimated ground/object acceleration, and the error statistics thereof; receiving radar altimeter measurements from the radar altimeter; determining a relative vertical acceleration based on a difference between a vehicle vertical acceleration and a ground/object vertical acceleration; determining a relative vertical velocity based on a difference between a vehicle vertical velocity and a ground/object vertical velocity; performing a consistency check on the relative vertical acceleration based on non-zero relative vertical acceleration conditions, and on conditions comparing an integrated relative vertical acceleration to the relative vertical velocity; performing a consistency check on the relative vertical velocity based on zero relative vertical acceleration conditions and non-zero relative vertical velocity conditions; and outputting estimated vertical position and vertical velocity statistics of the vehicle for compensation of estimated vertical position and vertical velocity statistics from the navigation filter; wherein the navigation filter is configured to output the compensated estimated vertical position and vertical velocity statistics to provide landing guidance for the vehicle.

Example 2 includes the system of Example 1, wherein the one or more aiding sensors comprise a global navigation satellite system (GNSS) receiver, a camera, a light detection and ranging (LiDAR) device, or a radar device.

Example 3 includes the system of any of Examples 1-2, further comprising an onboard barometer configured to produce barometric pressure measurements for the vehicle, wherein the barometric pressure measurements are fed to the RIVL filter.

Example 4 includes the system of any of Examples 1-3, wherein the one or more terrain and object maps include a terrain map of local ground level with altitude above, at, or below WGS-84 ellipsoid, and an object map with object altitude above the local ground level.

Example 5 includes the system of any of Examples 1-4, wherein the estimated kinematic state statistics for the vehicle comprise horizontal position and error statistics, vertical position and error statistics, vertical velocity and error statistics, vertical acceleration and error statistics, and roll/pitch and error statistics.

Example 6 includes the system of any of Examples 1-5, wherein the roll/pitch and error statistics, the radar altimeter measurements, and a radar altimeter angular orientation on the vehicle are fed to a processing module, which is operative to resolve the radar altimeter measurements into a north-east-down (NED) frame, which is then fed to the RIVL filter.

Example 7 includes the system of any of Examples 1-6, wherein the estimated ground/object velocity, ground/object acceleration, and error statistics thereof, are computed using ground modeling to approximate ground elevation changes and stationary objects as ground velocities and ground accelerations.

Example 8 includes the system of Example 7, wherein the ground modeling uses ramp modeling for the ground elevation changes, and step modeling for the stationary objects.

Example 9 includes the system of any of Examples 1-8, wherein the RIVL filter comprises: a first subtractor configured to calculate the difference between the vehicle vertical acceleration and the ground/object vertical acceleration, and to output the difference as the relative vertical acceleration; and a second subtractor configured to calculate the difference between the vehicle vertical velocity and the ground vertical velocity, and to output the difference as the relative vertical velocity.

Example 10 includes the system of Example 9, wherein the RIVL filter further comprises: a consistency check module operatively coupled to the first and second subtractors, the consistency check module operative to perform the consistency checks on the relative vertical acceleration and the relative vertical velocity; a set of adaptable input switches operatively coupled to the consistency check module, the adaptable input switches operative based on motion of the vehicle and changes to the ground terrain, including the non-zero relative acceleration conditions, and the zero relative acceleration conditions with non-zero relative velocity; and a third order loop that operatively communicates with the consistency check module through the adaptable input switches.

Example 11 includes the system of Example 10, wherein the third order loop includes a set of feedback control gains, along with associated operators, and is operative to damp or control instability of vertical channel errors.

Example 12 includes the system of any of Examples 10-11, wherein: the relative vertical acceleration is sent from the first subtractor to an integrator, which integrates the relative vertical acceleration to obtain a corresponding integrated vertical velocity that is sent to the consistency check module; the relative vertical velocity is sent from the second subtractor to the consistency check module; wherein the consistency check module is operative to perform a first consistency check to confirm that the relative vertical acceleration is non-zero, the first consistency check performed between the corresponding integrated vertical velocity and the relative vertical velocity; wherein if the first consistency check is passed, then the non-zero relative vertical acceleration is directed by the adaptable input switches to the third order loop; wherein if the first consistency check fails, then the relative vertical velocity is passed to a second consistency check to confirm that the relative vertical velocity is non-zero; wherein if the second consistency check passes, then the relative vertical velocity is directed by the adaptable input switches to the third order loop; wherein if all the consistency checks fail, then a zero relative vertical acceleration is input to the third order loop.

Example 13 includes the system of any of Examples 10-12, wherein the consistency check module is further operative to perform a consistency check on the radar altimeter measurements when a barometer is onboard the vehicle.

Example 14 includes the system of any of Examples 1-13, wherein the RIVL filter is configured for use with a Kalman filter by implementing the RIVL filter with sensor models, map models, vertical motion dynamic models, and sensor measurement models.

Example 15 includes the system of any of Examples 1-14, wherein the vehicle is an unmanned aircraft system (UAS) vehicle, or an urban air mobility (UAM) vehicle.

Example 16 includes a method for providing landing guidance, the method comprising: providing at least one processor onboard a vehicle, the at least one processor including a radar altimeter inertial vertical loop (RIVL) filter; inputting horizontal position statistics and vertical position statistics from an onboard navigation filter into an onboard map database, wherein the navigation filter receives aiding data from one or more aiding sensors onboard the vehicle and inertial data from an inertial measurement unit (IMU) onboard the vehicle; computing an estimated ground/object height, an estimated ground/object velocity, an estimated ground/object acceleration, and error statistics thereof, based on terrain and object map data from the map database; inputting the estimated ground/object height, the estimated ground/object velocity, the estimated ground/object acceleration, and the error statistics thereof into the RIVL filter; inputting radar altimeter measurements from an onboard radar altimeter into the RIVL filter; determining, in the RIVL filter, a relative vertical acceleration based on a difference between a vehicle vertical acceleration and a ground/object vertical acceleration; determining, in the RIVL filter, a relative vertical velocity based on a difference between a vehicle vertical velocity and a ground/object vertical velocity; performing, in the RIVL filter, a consistency check on the relative vertical acceleration based on non-zero relative vertical acceleration conditions, and on conditions comparing an integrated relative vertical acceleration to the relative vertical velocity; performing, in the RIVL filter, a consistency check on the relative vertical velocity based on zero relative vertical acceleration conditions and non-zero relative vertical velocity conditions; outputting, from the RIVL filter, estimated vertical position and vertical velocity statistics of the vehicle for compensation of estimated vertical position and vertical velocity statistics from the navigation filter; and outputting, from compensated navigation filter outputs, the compensated estimated vertical position and vertical velocity statistics to provide for landing guidance of the vehicle.

Example 17 includes the method of Example 16, further comprising: inputting barometric pressure measurements from an onboard barometer into the RIVL filter; and performing a consistency check on the radar altimeter measurements based on the barometric pressure measurements and a terrain map in the map database.

Example 18 includes the method of any of Examples 16-17, further comprising: resolving the radar altimeter measurements into a north-east-down (NED) frame prior to inputting the radar altimeter measurements into the RIVL filter.

Example 19 includes the method of any of Examples 16-18, wherein the RIVL filter is configured for use with a Kalman filter by implementing the RIVL filter with sensor models, map models, vertical motion dynamic models, and sensor measurement models.

Example 20 includes the method of any of Examples 16-19, wherein the vehicle is an unmanned aircraft system (UAS) vehicle, or an urban air mobility (UAM) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
   one or more aiding sensors onboard a vehicle;
   an onboard inertial measurement unit (IMU) operative to produce inertial measurements for the vehicle;
   an onboard radar altimeter operative to produce radar altimeter measurements for the vehicle;
   an onboard map database comprising one or more terrain and object maps;
   an onboard navigation system operative to receive aiding data from the one or more aiding sensors and inertial data from the IMU, the navigation system including a navigation filter operative to generate estimated kinematic state statistics for the vehicle based on the aiding data and the inertial data; and
   at least one processor onboard the vehicle, the at least one processor operative to execute processor readable instructions to perform a method comprising:
      inputting horizontal position statistics and vertical position statistics from the navigation filter into the map database; and
      computing an estimated ground/object height, an estimated ground/object velocity, an estimated ground/object acceleration, and error statistics thereof, based on terrain and object map data from the map database;
   wherein the at least one processer includes a radar altimeter inertial vertical loop (RIVL) filter, wherein the RIVL filter is operative to perform a method comprising:
      receiving the estimated ground/object height, the estimated ground/object velocity, the estimated ground/object acceleration, and the error statistics thereof;
      receiving radar altimeter measurements from the radar altimeter;
      determining a relative vertical acceleration based on a difference between a vehicle vertical acceleration and a ground/object vertical acceleration;
      determining a relative vertical velocity based on a difference between a vehicle vertical velocity and a ground/object vertical velocity;
      performing a consistency check on the relative vertical acceleration based on non-zero relative vertical acceleration conditions, and on conditions comparing an integrated relative vertical acceleration to the relative vertical velocity;
      performing a consistency check on the relative vertical velocity based on zero relative vertical acceleration conditions and non-zero relative vertical velocity conditions; and
      outputting estimated vertical position and vertical velocity statistics of the vehicle for compensation of estimated vertical position and vertical velocity statistics from the navigation filter;
   wherein the navigation filter is configured to output the compensated estimated vertical position and vertical velocity statistics to provide landing guidance for the vehicle.

2. The system of claim 1, wherein the one or more aiding sensors comprise a global navigation satellite system (GNSS) receiver, a camera, a light detection and ranging (LiDAR) device, or a radar device.

3. The system of claim 1, further comprising an onboard barometer configured to produce barometric pressure measurements for the vehicle, wherein the barometric pressure measurements are fed to the RIVL filter.

4. The system of claim 1, wherein the one or more terrain and object maps include a terrain map of local ground level with altitude above, at, or below WGS-84 ellipsoid, and an object map with object altitude above the local ground level.

5. The system of claim 1, wherein the estimated kinematic state statistics for the vehicle comprise horizontal position and error statistics, vertical position and error statistics, vertical velocity and error statistics, vertical acceleration and error statistics, and roll/pitch and error statistics.

6. The system of claim 1, wherein the roll/pitch and error statistics, the radar altimeter measurements, and a radar altimeter angular orientation on the vehicle are fed to a processing module, which is operative to resolve the radar altimeter measurements into a north-east-down (NED) frame, which is then fed to the RIVL filter.

7. The system of claim 1, wherein the estimated ground/object velocity, ground/object acceleration, and error statistics thereof, are computed using ground modeling to approximate ground elevation changes and stationary objects as ground velocities and ground accelerations.

8. The system of claim 7, wherein the ground modeling uses ramp modeling for the ground elevation changes, and step modeling for the stationary objects.

9. The system of claim 1, wherein the RIVL filter comprises:
   a first subtractor configured to calculate the difference between the vehicle vertical acceleration and the ground/object vertical acceleration, and to output the difference as the relative vertical acceleration; and
   a second subtractor configured to calculate the difference between the vehicle vertical velocity and the ground vertical velocity, and to output the difference as the relative vertical velocity.

10. The system of claim 9, wherein the RIVL filter further comprises:
    a consistency check module operatively coupled to the first and second subtractors, the consistency check module operative to perform the consistency checks on the relative vertical acceleration and the relative vertical velocity;
    a set of adaptable input switches operatively coupled to the consistency check module, the adaptable input switches operative based on motion of the vehicle and changes to the ground terrain, including the non-zero relative acceleration conditions, and the zero relative acceleration conditions with non-zero relative velocity; and
    a third order loop that operatively communicates with the consistency check module through the adaptable input switches.

11. The system of claim 10, wherein the third order loop includes a set of feedback control gains, along with associated operators, and is operative to damp or control instability of vertical channel errors.

12. The system of claim 10, wherein:
the relative vertical acceleration is sent from the first subtractor to an integrator, which integrates the relative vertical acceleration to obtain a corresponding integrated vertical velocity that is sent to the consistency check module;
the relative vertical velocity is sent from the second subtractor to the consistency check module;
wherein the consistency check module is operative to perform a first consistency check to confirm that the relative vertical acceleration is non-zero, the first consistency check performed between the corresponding integrated vertical velocity and the relative vertical velocity;
wherein if the first consistency check is passed, then the non-zero relative vertical acceleration is directed by the adaptable input switches to the third order loop;
wherein if the first consistency check fails, then the relative vertical velocity is passed to a second consistency check to confirm that the relative vertical velocity is non-zero;
wherein if the second consistency check passes, then the relative vertical velocity is directed by the adaptable input switches to the third order loop;
wherein if all the consistency checks fail, then a zero relative vertical acceleration is input to the third order loop.

13. The system of claim 10, wherein the consistency check module is further operative to perform a consistency check on the radar altimeter measurements when a barometer is onboard the vehicle.

14. The system of claim 1, wherein the RIVL filter is configured for use with a Kalman filter by implementing the RIVL filter with sensor models, map models, vertical motion dynamic models, and sensor measurement models.

15. The system of claim 1, wherein the vehicle is an unmanned aircraft system (UAS) vehicle, or an urban air mobility (UAM) vehicle.

16. A method for providing landing guidance, the method comprising:
providing at least one processor onboard a vehicle, the at least one processor including a radar altimeter inertial vertical loop (RIVL) filter;
inputting horizontal position statistics and vertical position statistics from an onboard navigation filter into an onboard map database, wherein the navigation filter receives aiding data from one or more aiding sensors onboard the vehicle and inertial data from an inertial measurement unit (IMU) onboard the vehicle;
computing an estimated ground/object height, an estimated ground/object velocity, an estimated ground/object acceleration, and error statistics thereof, based on terrain and object map data from the map database;
inputting the estimated ground/object height, the estimated ground/object velocity, the estimated ground/object acceleration, and the error statistics thereof into the RIVL filter;
inputting radar altimeter measurements from an onboard radar altimeter into the RIVL filter;
determining, in the RIVL filter, a relative vertical acceleration based on a difference between a vehicle vertical acceleration and a ground/object vertical acceleration;
determining, in the RIVL filter, a relative vertical velocity based on a difference between a vehicle vertical velocity and a ground/object vertical velocity;
performing, in the RIVL filter, a consistency check on the relative vertical acceleration based on non-zero relative vertical acceleration conditions, and on conditions comparing an integrated relative vertical acceleration to the relative vertical velocity;
performing, in the RIVL filter, a consistency check on the relative vertical velocity based on zero relative vertical acceleration conditions and non-zero relative vertical velocity conditions;
outputting, from the RIVL filter, estimated vertical position and vertical velocity statistics of the vehicle for compensation of estimated vertical position and vertical velocity statistics from the navigation filter; and
outputting, from compensated navigation filter outputs, the compensated estimated vertical position and vertical velocity statistics to provide for landing guidance of the vehicle.

17. The method of claim 16, further comprising:
inputting barometric pressure measurements from an onboard barometer into the RIVL filter; and
performing a consistency check on the radar altimeter measurements based on the barometric pressure measurements and a terrain map in the map database.

18. The method of claim 16, further comprising:
resolving the radar altimeter measurements into a north-east-down (NED) frame prior to inputting the radar altimeter measurements into the RIVL filter.

19. The method of claim 16, wherein the RIVL filter is configured for use with a Kalman filter by implementing the RIVL filter with sensor models, map models, vertical motion dynamic models, and sensor measurement models.

20. The method of claim 16, wherein the vehicle is an unmanned aircraft system (UAS) vehicle, or an urban air mobility (UAM) vehicle.

* * * * *